United States Patent
Yamada et al.

(10) Patent No.: US 6,928,151 B2
(45) Date of Patent: Aug. 9, 2005

(54) METHOD AND APPARATUS FOR LIMITING CALL ORIGINATION ACCOMPANIED BY EXECUTING APPLICATION

(75) Inventors: Kazuhiro Yamada, Yokohama (JP); Tatsuaki Wakabayashi, Yokohama (JP); Dai Kamiya, Ichikawa (JP)

(73) Assignee: NTT DoCoMo, Inc., Tokyo (JP)

( * ) Notice: Subject to any disclaimer, the term of this patent is extended or adjusted under 35 U.S.C. 154(b) by 441 days.

(21) Appl. No.: 10/240,607

(22) PCT Filed: Jan. 30, 2002

(86) PCT No.: PCT/JP02/00698

§ 371 (c)(1),
(2), (4) Date: Sep. 27, 2002

(87) PCT Pub. No.: WO02/062044

PCT Pub. Date: Aug. 8, 2002

(65) Prior Publication Data

US 2003/0142804 A1 Jul. 31, 2003

(30) Foreign Application Priority Data

Jan. 31, 2001 (JP) .......................................... 2001-24737

(51) Int. Cl.⁷ ............................................... H04M 3/00
(52) U.S. Cl. .................. 379/188; 379/142.05; 379/196; 455/410
(58) Field of Search .......................... 379/93.01, 93.02, 379/142.04, 142.05, 188, 189, 196, 197, 200; 455/410, 411

(56) References Cited

U.S. PATENT DOCUMENTS

| | | | | |
|---|---|---|---|---|
| 5,181,238 A | * | 1/1993 | Medamana et al. ...... | 379/93.03 |
| 5,303,285 A | * | 4/1994 | Kerihuel et al. ............ | 455/461 |
| 5,737,701 A | * | 4/1998 | Rosenthal et al. .......... | 455/411 |
| 6,049,272 A | | 4/2000 | Lee et al. | |
| 6,330,317 B1 | * | 12/2001 | Garfinkel ..................... | 379/196 |
| 6,731,731 B1 | * | 5/2004 | Ueshima ..................... | 379/196 |
| 2001/0044309 A1 | | 11/2001 | Bar et al. | |

FOREIGN PATENT DOCUMENTS

| | | |
|---|---|---|
| JP | 1-273468 | 11/1989 |
| JP | 2-148950 | 6/1990 |
| JP | 3-28853 | 3/1991 |
| JP | 6-164714 | 6/1994 |
| JP | 6-291835 | 10/1994 |
| JP | 7-15554 | 1/1995 |
| JP | 2000-332818 | 11/2000 |
| JP | 2001-36636 | 2/2001 |
| KR | 2001-0002775 | 1/2001 |

* cited by examiner

*Primary Examiner*—Bing Q. Bui
(74) *Attorney, Agent, or Firm*—Brinks Hofer Gilson & Lione

(57) ABSTRACT

When an application originates a call to a certain communication node, an application manager refers to history of outgoing/incoming call data and/or telephone directory data to determine whether the call origination processing should be granted. If the telephone number of the communication node for which call organization is to be performed is included in the history of outgoing/incoming calls and/or the telephone directory data, then the call origination processing may be granted because the number may be considered a number with which communication was made in the past or may be recognized as a valid number to communicate with.

46 Claims, 5 Drawing Sheets

| HISTORY OF OUTGOING CALLS | | HISTORY OF INCOMING CALLS | |
|---|---|---|---|
| OUTGOING DATE/TIME | OUTGOING TELEPHONE NUMBER | INCOMING DATE/TIME | INCOMING TELEPHONE NUMBER |
| 2000.9.20. 8 : 00 | 090-1111-1111 | 2000.8.31.12 : 20 | 090-3333-3333 |
| 2000.9.21.15 : 23 | 090-2222-2222 | 2000.9. 4.11 : 10 | 090-4444-4444 |
| ...... | ...... | ...... | ...... |
| ...... | ...... | ...... | ...... |
| ...... | ...... | ...... | ...... |
| ...... | ...... | ...... | ...... |
| ...... | ...... | ...... | ...... |
| ...... | ...... | ...... | ...... |

*FIG. 3*

| HISTORY OF OUTGOING CALLS | | HISTORY OF INCOMING CALLS | |
|---|---|---|---|
| OUTGOING DATE/TIME | OUTGOING TELEPHONE NUMBER | INCOMING DATE/TIME | INCOMING TELEPHONE NUMBER |
| 2000.9.20. 8:00 | 090-1111-1111 | 2000.8.31.12:20 | 090-3333-3333 |
| 2000.9.21.15:23 | 090-2222-2222 | 2000.9. 4.11:10 | 090-4444-4444 |
| ...... | ...... | ...... | ...... |
| ...... | ...... | ...... | ...... |
| ...... | ...... | ...... | ...... |
| ...... | ...... | ...... | ...... |
| ...... | ...... | ...... | ...... |

| TELEPHONE DIRECTORY ||
|---|---|
| NAME | TELEPHONE NUMBER |
| ○○×× | 090-5555-5555 |
| △△□□ | 090-6666-6666 |
| ...... | ...... |
| ...... | ...... |
| ...... | ...... |
| ...... | ...... |
| ...... | ...... |
| ...... | ...... |

METHOD AND APPARATUS FOR LIMITING CALL ORIGINATION ACCOMPANIED BY EXECUTING APPLICATION

TECHNICAL FIELD

The present invention relates to a method and an apparatus for limiting call originations resulting from executing an application at a communication terminal.

BACKGROUND

Advancement of portable telephones is accelerating. A portable telephone is able to access a server on the Internet to download a variety of contents and applications. Such applications that are downloaded from a network and used include, for example, an application called "Java Applet" written in the Java (registered trademark) programming language.

Open networks, including the Internet, generally have poor security, and hence, Java Applets distributed through such an open network are not necessarily reliable.

Accordingly, it is necessary to exclude access to networks established by an illegal Java Applet. To meet this demand, an access limiting technique called the "sandbox model" has been proposed. The sandbox model allows communication terminals, which act as clients, only to access a server from which a Java Applet is downloaded.

However, network resources will potentially be further integrated or distributed in the future. In such situations, the existing access limiting technique mentioned above may be inadequate.

BRIEF SUMMARY

Accordingly, it is an object of the present invention to propose a new mechanism for limiting network accesses when executing applications on a communication terminal.

To this end, the present invention provides a call origination limiting method including: a comparison step for comparing, when a call origination is performed from a communication terminal accompanied by executing an application, a telephone number of a communication node, for which a call origination is to be implemented, with a telephone number of a communication node which has been stored in a storing means beforehand and for which a call origination has been granted; and a determination step for determining whether the call origination should be granted or not based on the comparison.

According to the present invention, when a call origination of a predetermined communication node is accompanied by executing an application, whether the call origination should be granted or not is determined by checking whether the telephone number of the communication node is one of the telephone numbers that have been granted in advance. This permits improved security to be achieved.

In a preferred form, the storing means is a memory for storing telephone directory data, and compares the telephone number of the communication node to be called with the telephone numbers included in the telephone directory data in the comparison step.

In another preferred form, the storing means is a memory for storing a history of outgoing/incoming calls, and compares the telephone number of the communication node to be called with telephone numbers of at least either the outgoing calls or incoming calls in the history of outgoing/incoming calls in the comparison step.

In still another preferred form, the storing means stores plural types of telephone number groups, and compares, in the comparison step, the telephone number of the communication node for which the call origination is to be implemented with a type of telephone number groups corresponding to an application to be executed.

In a preferred form, the call origination limiting method is provided with a step for outputting a predetermined error message and prompting instructions from a user whether a call origination is to be performed if a call origination processing has been rejected in the determination step, and a step for accepting the instructions from the user whether the call origination should be performed and carrying out the call origination.

In each form described above, the call origination is a processing for line connection for voice communication or data communication.

The present invention can be implemented also in a form wherein a carrying out program for the call origination limiting method described above is distributed to a user through a telecommunication line, or in a form wherein such a program stored in a computer-readable medium is distributed to a user.

Furthermore, the present invention can be implemented in a form wherein a communication terminal for carrying out the method for limiting call origination explained above is manufactured and marketed. Such a communication terminal is provided with a means for storing telephone numbers of communication nodes for which a call origination has been granted, a means for comparing a telephone number of a communication node for which a call origination is to be implemented with the telephone numbers stored in the storing means when a call origination is accompanied by executing an application, and a means for determining whether the call origination should be granted or not based on the comparison.

An example of the communication terminal is a portable telephone performing radio communication.

BRIEF DESCRIPTION OF THE DRAWINGS

FIG. 3 is a diagram showing an example of a history of outgoing/incoming calls stored in the portable telephone in the embodiment.

DETAILED DESCRIPTION OF THE DRAWINGS AND THE PRESENTLY PREFERRED EMBODIMENTS

Figure 1:
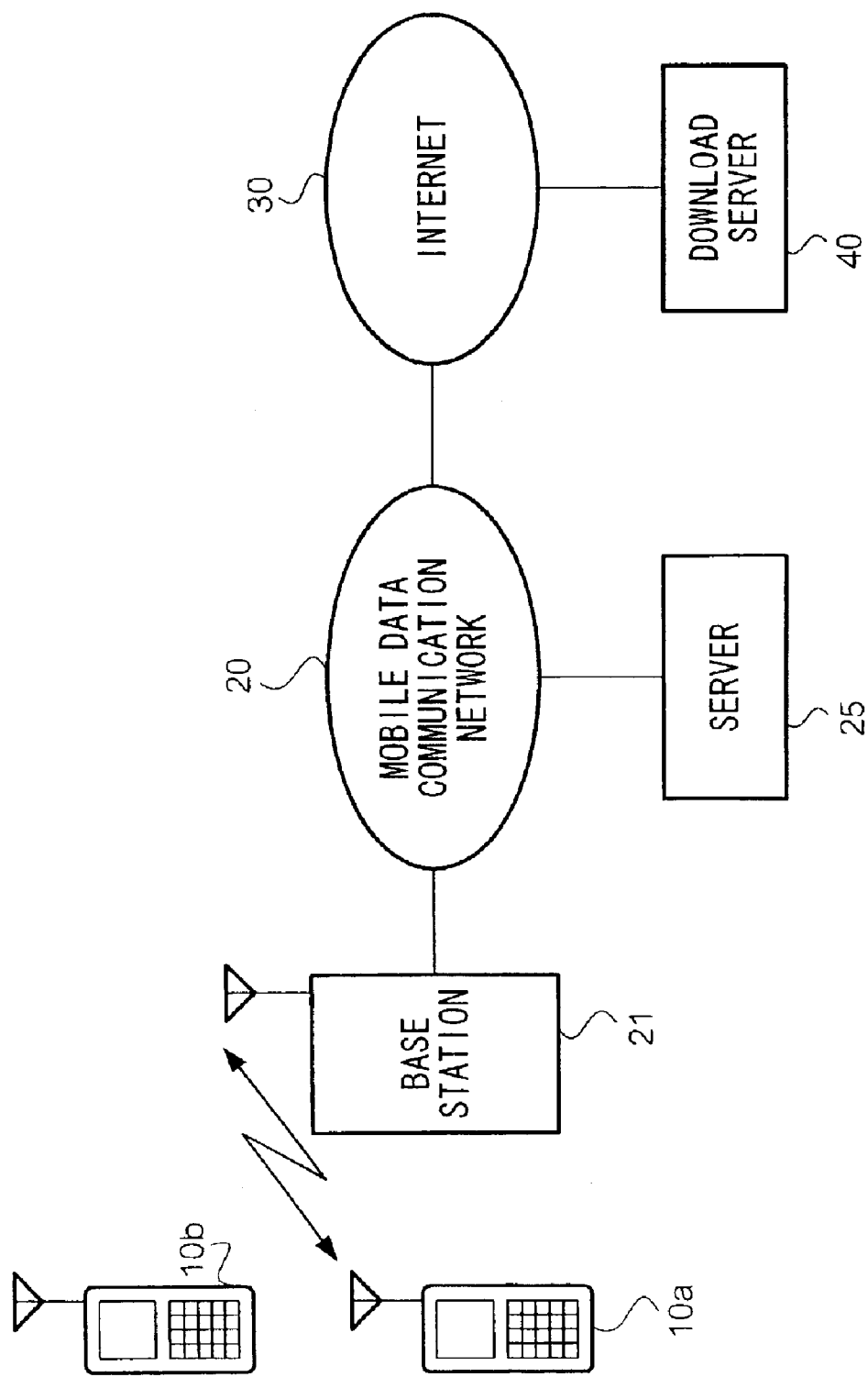
FIG. 1 is a block diagram showing an entire system configuration in accordance with an embodiment of the present invention.

Referring to the drawings, an embodiment will be described in accordance with the present invention as follows:

In this embodiment, a portable telephone for radio data communication executes an application written in Java (registered trademark) programming language (hereinafter referred to as "Java application"). The present invention, however, may be implemented with various modifications within the scope of the technological spirit thereof, rather than being limited to the embodiment.

A: Configuration (1) Configuration of the Entire System

FIG. 1 is a block diagram showing the configuration of the entire system according to the embodiment of the present invention. As shown in the drawing, the system is constructed of portable telephones 10a and 10b, a mobile data communication network 20, a server 25, the Internet 30, and a download server 40.

The portable telephones 10a and 10b are owned by users to receive call services of a mobile telephone network, which is not shown, and to perform radio communication with a base station 21 of the mobile data communication network 20 in order to receive the data communication service of the mobile data communication network 20. The portable telephones 10a and 10b incorporate a browser for browsing various pages on the Internet 30 and a Java virtual machine for supporting Java (registered trademark), which allows various Java applications to be executed.

The portable telephones 10a and 10b share the same configuration and operation, so they shall be generically referred to as a portable telephone 10 hereinafter, unless it is necessary to distinguish them.

The mobile data communication network 20 comprises base station 21, switching office, which is not shown, and communication lines for connecting them. Multiple base stations 21 are deployed at predetermined intervals in a communication service area of the mobile data communication network 20 to effect radio communication with the portable telephones 10 movably located in respective radio cells. The mobile data communication network 20 is connected to the Internet 30 through a gateway, which is not shown, so that two-way data transfer is possible between the networks.

The download server 40 has data in an HTML (Hypertext Markup Language) format that can be accessed by using the browser of the portable telephone 10, and various types of Java applications. The download server 40 provides the Java applications to the portable telephone 10 through the intermediary of the Internet 30 and the mobile data communication network 20.

Java applications in the download server 40 include, for example, software for providing PIM (Personal Information Management) to a user of the portable telephone 10 and game software for the user of the portable telephone 10 to play an adversarial game with another user. When these Java applications are downloaded from the download server 40 to the portable telephone 10 and executed by the portable telephone 10, a predetermined communication node is called, and processing is carried out by communicating with the communication node. There is also a Java application in which, when a user specifies a call destination communication node, a so-called "PhoneTo" function is implemented to call the communication node to effect voice communication.

In this case, server 25, portable telephones 10 other than the portable telephone 10 that executes an application, and fixed telephones, which are not shown may be, for example, the call destination communication node.

The server 25 may provide a user with the PIM service. More specifically, the server 25 has a memory area for storing schedules, note pads, etc. of each user, and may update such data in response to requests received from the portable telephone 10 of each user. In this case, the Java application downloaded into the portable telephone 10 is executed to control the portable telephone 10 to call the server 25 and interact with the server 25 to receive the PIM service.

If the Java application downloaded into the portable telephone 10 is an adversarial game to play with another portable telephone 10, then the portable telephone 10a, for example, may call the portable telephone 10b. Thereafter, communication is carried out between the portable telephones 10a and 10b to execute the Java application.

Thus, a Java application is executed on the portable telephone 10 so as to connect a line by calling a predetermined communication node and to execute processing (including voice communication processing) by communicating with the communication node.

However, when an illegal application mentioned above is present, it is not desirable to allow, without limitation, a call origination processing in accordance with an instruction from Java applications. For this reason, the embodiment imposes a certain limitation on call origination processing resulting from executing a Java application.

(2) Hardware Configuration of Portable Telephone 10

Referring now to the block diagram shown in FIG. 2, the hardware configuration of the portable telephone 10 will be described.

Figure 2:
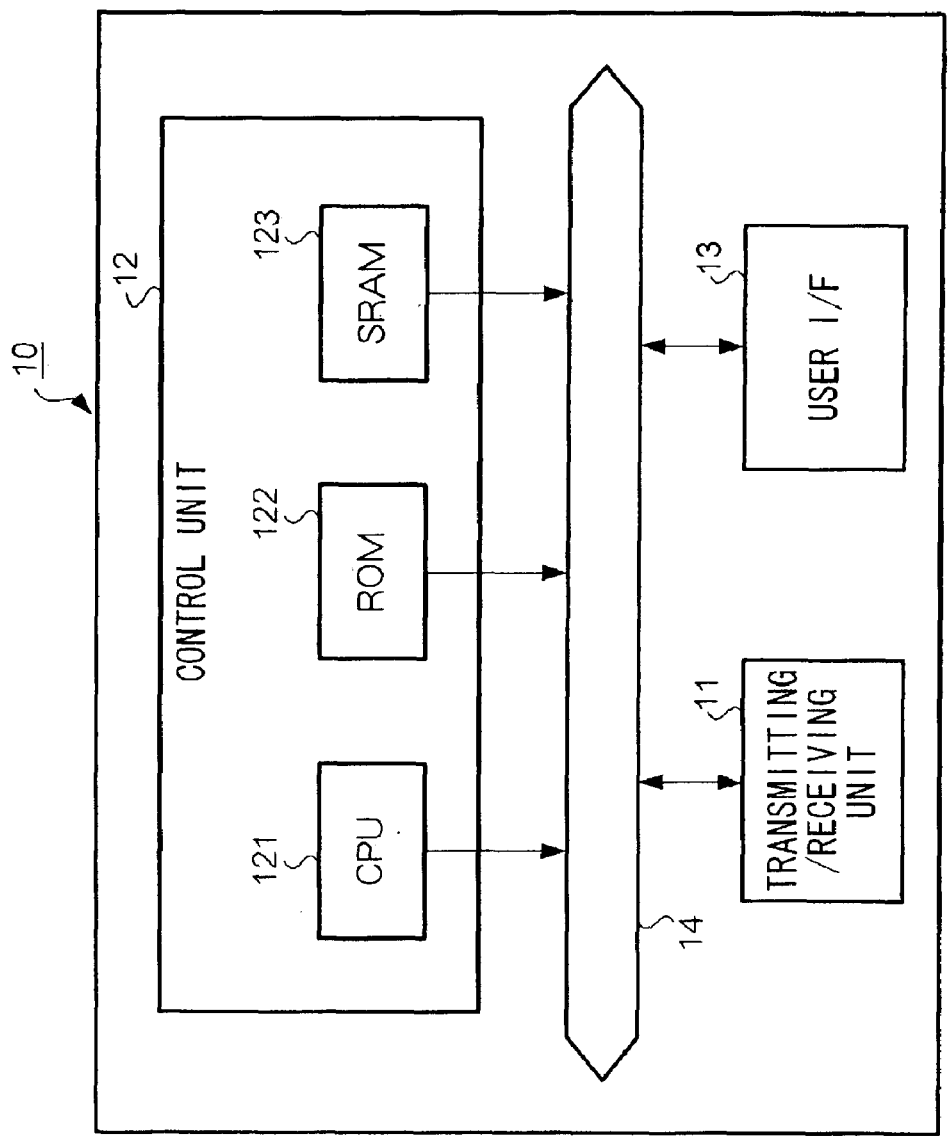
FIG. 2 is a block diagram showing a hardware configuration of a portable telephone in the embodiment.

As shown in FIG. 2, the portable telephone 10 is constructed of a transmitting/receiving unit 11, a control unit 12, a user interface unit 13, and a bus 14 interconnecting them.

The transmitting/receiving unit 11 comprises an antenna and a communication control circuit, which are not shown, and performs radio communication with the base stations 21 of the mobile data communication network 20.

The user interface unit 13 comprises a liquid crystal display for displaying various types of information, a key pad for a user to perform various types of input operations, and a microphone with a speaker for telephone calls of the user.

The control unit 12 controls each part of the portable telephone 10, and comprises a CPU 121, a ROM 122, and an SRAM 123.

Various control programs or the like are stored in the ROM 122, and the CPU 121 reads the control programs to execute various types of control processing. Control programs in the ROM 122 include an operating system in the portable telephone 10, a browser, and various types of software, which are discussed below.

The SRAM 123 is used as a work area of the CPU 121. The SRAM 123 also stores Java applications downloaded from the download server 40, the history of outgoing/incoming calls of the portable telephone 10, and telephone directory data entered by a user.

Figures 4, 5:
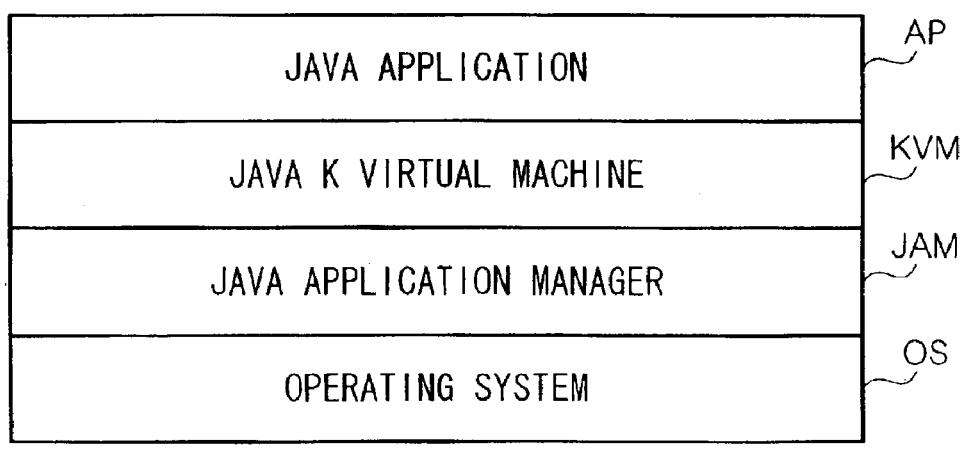
FIG. 4 is a diagram showing an example of telephone directory data stored in the portable telephone in the embodiment.
FIG. 5 is a schematic diagram showing a software configuration of the portable telephone in the embodiment.

FIG. 3 is a diagram showing an example of the history of outgoing/incoming calls stored in the SRAM 123. FIG. 4 is a diagram showing exemplary telephone directory data stored in the SRAM 123.

As shown in FIG. 3, the history of outgoing calls is stored. The history of outgoing calls includes the date and time when the portable telephone 10 made each call, along with the corresponding outgoing telephone number of the communication node from which the telephone call was made (the originating telephone number). Similarly, the history of incoming calls is stored. The history of incoming calls include the date and time when the portable telephone 10 received each call, along with the corresponding incoming telephone number of the communication node from which the telephone call, corresponding to the received call, was made (the incoming telephone number).

Furthermore, the telephone directory data is stored with corresponding names and telephone numbers, as shown in FIG. 4.

Storing of histories of outgoing and incoming calls as known in the art shall be applied and the explanation thereof is omitted.

(3) Software Configuration of Portable Telephone

FIG. 5 is a schematic diagram showing the software configuration of the portable telephone 10. As shown in FIG. 5, the software of the portable telephone 10 comprises, in order from a lowermost layer to an uppermost layer, an operating system OS, a Java application manager JAM, a Java K virtual machine KVM and a Java application AP.

The operating system OS comprises well-known software installed in a portable telephone to support basic processing of the portable telephone 10.

The Java application manager JAM is software primarily to control and check security on the Java K virtual machine KVM. More specifically, the Java application manager JAM accesses the aforesaid histories of outgoing/incoming calls and the telephone directory data. The Java application manager JAM determines whether to execute the call origination processing by checking whether the telephone number of the above communication node is included in the histories of outgoing/incoming calls when, during execution of Java application AP, a call origination is processed to a predetermined communication node. The determination is based on an idea: call origination processing may be granted in such cases that the node communication telephone number of the call origination is included in the histories of outgoing/incoming calls or the telephone directory data, because the portable telephone 10 communicated with the communication node in the past or the user recognized it as a communication partner.

The Java K virtual machine KVM executes the Java application under the control of the Java application manager JAM. The Java virtual machine KVM and the Java application manager JAM are incorporated into the operating system OS in advance, all of which are stored in the ROM 122.

The Java application AP is the software written in the Java (registered trademark) programming language as mentioned above. The Java application AP is downloaded into the portable telephone 10 from the download server 40, and then written to and stored in the SRAM 123.

B: Operation

The operation of the embodiment with the above configurations will now be explained.

Figure 6:
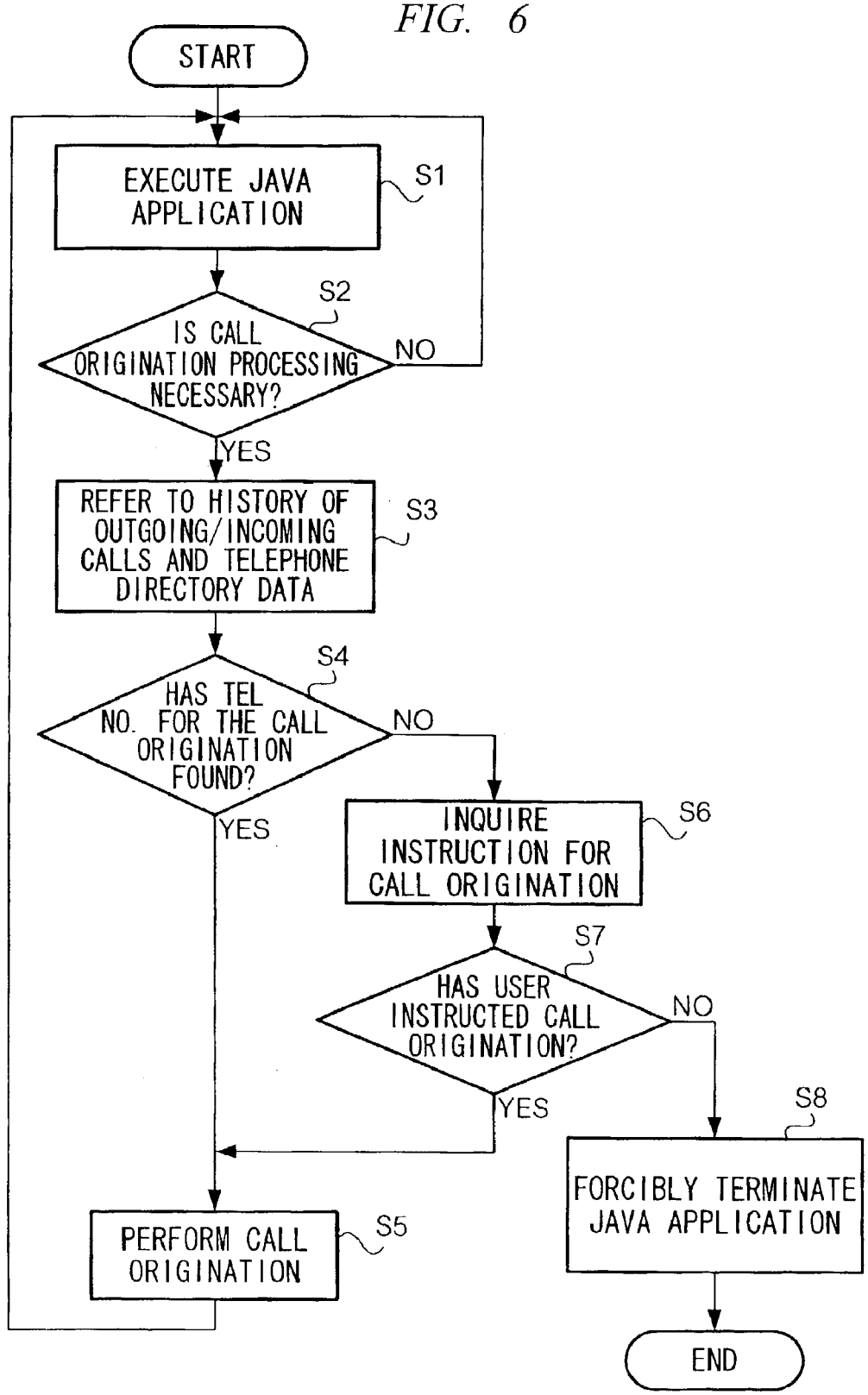
FIG. 6 is a flowchart showing a processing operation performed when a Java virtual machine of the portable telephone in the embodiment executes a downloaded Java application.

FIG. 6 is a flowchart showing the processing when executing the Java application AP by the portable telephone 10.

When an instruction is issued to begin a requested Java application AP by user's operation, the Java application AP is begun on the Java K virtual machine KVM shown in FIG. 3 in response to the instruction. The processing of the Java application AP is executed unit by unit, with an executed unit being called a "class" (step S1).

Then, it is determined whether the class to be executed during processing requires call origination to a communication node (step S2).

If the class does not require call origination processing (NO in step S2), then the Java K virtual machine KVM repeats the processing of step St, and executes the processing corresponding to the class.

If the class requires call origination processing (YES in step S2), then the Java application manager JAM refers to the telephone number of the communication node, for which the call origination processing is to be implemented, the histories of outgoing/incoming calls and the telephone directory data, and compares them in response to a request from the Java K virtual machine KVM (step S3).

If the comparison indicates that the telephone number of the communication node for which the call origination processing is to be implemented is in the histories of outgoing/incoming calls or the telephone directory data (YES in step S4), then the Java application manager JAM grants the call origination processing and instructs the Java K virtual machine KVM to execute the call origination processing (step S5).

If the telephone number of the communication node for which the call origination processing is to be carried out is not found in the histories of outgoing/incoming calls and the telephone directory data (NO in step S4), then the call origination processing is not granted. The Java application manager JAM instructs the Java K virtual machine KVM to display a message on a liquid crystal display, indicating that the call origination processing cannot be granted, together with another message indicating that user instruction is necessary to perform call origination (step S6).

The display in this case may be a message, for example, "You need to call oo-xxxx-ΔΔΔΔ to continue the processing. Are you making the call? Press key 1 for YES or press key 2 for NO."

If the user issues an instruction to make the call (YES in step S7), then the processing transfers to step S5 wherein the Java K virtual machine KVM executes the call origination processing. Then, the processing returns to step S1 wherein the processing for executing the Java application AP is continued.

In this case, call origination is made in the step S5 processing so that the telephone number used for making the call is stored in the history of outgoing calls. Hence, the call origination processing will be granted thereafter for this telephone number when comparing the telephone number with the history of outgoing calls step S4.

If an instruction is issued by the user not to make the call (NO in step S7), then the Java application manager JAM forcibly terminates the Java application AP in response to the instruction (step S8).

In this way, a call origination is granted only if the result indicates conformity after the comparison of the communication node telephone number to be implemented for the call origination with the histories of outgoing/incoming calls and the telephone directory data.

In this embodiment, call originations are limited to the communication nodes called before or the communication nodes registered in the telephone directory by the user in order to ensure the security.

C: Modification Examples

As previously mentioned, the present invention is not limited to the embodiment described above, and may be implemented in various modifications as shown below.

(1) Form of Each Communication Node

In the embodiment described above, the portable telephone 10 is the device executing applications. The device executing applications, however, is not limited thereto; it may be a fixed telephone, or a personal computer connected to a portable telephone or a fixed telephone.

A communication node to be called is not limited to the server 25 or the portable telephone 10; the communication node may be a personal computer or the like connected to a fixed network and placed at a home or in an office.

Thus, the devices executing the applications and the objects to be called are not limited to those disclosed.

Devices executing the applications or the objects to be called may be any communication nodes to which lines are connected by using telephone numbers to perform data communication or voice communication.

(2) The Use of the Histories of Outgoing/Incoming Calls and Telephone Directory Data In the embodiment, both the histories of outgoing/incoming calls and the telephone directory data are used to determine whether to grant the call origination processing; however, the present invention is not limited thereto. Alternatively, whether to grant call origination processing may be determined by using only the history of outgoing calls, only the history of incoming calls, or only the telephone directory data, or by using at least two of them.

(3) Processing for Different Applications

In the embodiment, when a plurality of Java applications AP have been installed in the portable telephone 10, whether to implement call origination is determined by referring to all of the histories of outgoing/incoming calls and the telephone directory data without distinguishing the applications; however, the present invention is not limited thereto. Alternatively, a database to be referred to when the determination is based may vary, depending upon what application AP is being executed.

For instance, for a first Java application, only the telephone directory data may be used to determine whether to implement call origination. For a second Java application, both histories of outgoing/incoming calls and telephone directory data may be used for the determination. And, for a third Java application, without making any determination, calls to all communication nodes may be granted.

A user may choose, every time a call is to be initiated, which data shall be used to determine whether to implement call origination. Or, the Java application manager JAM may determine whether to implement call origination according to attributes of a Java application AP.

Java applications AP are not necessarily limited to those downloaded from a network. For example, some Java applications AP are stored in the ROM 122 in advance. Such Java Applications AP are considered to be high security and no limitation may be put on the call originations. Furthermore, Java applications AP that are downloaded from a download server 40 that has been authenticated by a predetermined certificate authority, may be expected to provide sufficient security. Hence, both the histories of outgoing/incoming calls and the telephone directory data may be used to determine whether to ease the restrictions on call origination. Sufficient security may not be expected for Java applications AP downloaded from a download server 40 that is not authenticated by any predetermined certificate authority. Hence, only a telephone directory data history may be used as the basis of the determinations, thereby enhancing restrictions on call origination.

(4) Programming Language

In the embodiment, the Java (registered trademark) has been used; the present invention, however, is not limited thereto. Other programming languages may be used.

What is claimed is:

1. A wireless communication terminal comprising:
multiple communication functionalities comprising a voice communication functionality and a network browsing functionality;
a network communication control that activates the network browsing functionality to access an external application source to thereby receive an application therefrom, wherein the application comprises at least one application unit executable on the wireless communication terminal;
an application platform that provides an execution environment for the received application in which the application platform executes each of the at least one application unit in the received application at a time, wherein before executing an application unit in the received application, the application platform determines if execution of the application unit will ensue an activation of the voice communication functionality to initiate a call to a telephone number and, if so determined, will suspend execution of the application unit until the telephone number is verified; and
telephone number manager that verifies the telephone number and allows the application platform to proceed to execute the application unit if the telephone number is verified, whereas otherwise disallowing the application platform to execute the object.

2. A communication terminal according to claim 1, wherein the application is a JAVA Applet.

3. A communication terminal according to claim 1, wherein the application platform is a JAVA virtual machine.

4. A communication terminal according to claim 1, further comprising at least one telephone number database, wherein the telephone number manager, in verifying the telephone number, searches one or more of the at least one telephone number database for the telephone number.

5. A communication terminal according to claim 4, wherein the at least one telephone number database comprises any of: a first database that stores telephone numbers to which calls were originated from the wireless communication terminal; a second database that stores telephone numbers from which calls were received by the wireless communication terminal; and a telephone directory stored in the wireless communication terminal.

6. A communication terminal according to claim 4, wherein the telephone number is verified when the telephone number is found in any of the one or more databases searched among the at least one telephone number database.

7. A communication terminal according to claim 6, wherein the telephone number is verified when the telephone number is found in a particular database selected from the at least one telephone number database.

8. A communication terminal according to claim 6, wherein the telephone member is verified when the telephone number is found commonly in more than one of the at least one telephone number database.

9. A communication terminal according to claim 1, wherein the telephone number manager selectively performs a different verification method for a different application.

10. A communication terminal according to claim 9, wherein the verification method varies according to attributes of the application.

11. A communication terminal according to claim 10, wherein one of the attributes is an application source from which the application is received.

12. A communication terminal according to claim 11, wherein the verification method varies, depending upon how trustworthy application source is.

13. A communication terminal according to claim 12, further comprising a plurality of telephone number databases, wherein the telephone number manager, in verifying the telephone number, searches for the telephone number one or more databases selected from the plurality of telephone number databases, depending on how trustworthy the application source is.

14. A communication terminal according to claim 13, wherein the plurality of telephone number databases comprises any of: a first database that stores telephone numbers to which calls were originated from the communication terminal; a second database that stores telephone numbers from which calls were received by the communication terminal; and a telephone directory stored in the communication terminal.

15. A communication terminal according to claim 14, wherein a telephone number, which came with an application whose source is trustworthy, is verified when the telephone number is found in any one of the first and second databases and the telephone directory.

16. A communication terminal according to claim 14, wherein a telephone number, which came with an application whose source is doubted in its trustworthiness, is verified when the telephone number is found in the telephone directory.

17. A communication terminal according to claim 1, wherein execution of the received application is terminated when the telephone number is not verified.

18. A communication terminal according to claim 1, wherein if the telephone number manager fails to verify the telephone number, a user of the communication terminal will be asked if it is permissible to allow the call to proceed to the telephone number.

19. A communication terminal according to claim 18, further comprising a display, wherein the user is asked through a visual message displayed on the display.

20. A communication terminal according to claim 18, wherein terminates execution of the application is terminated when permission is not obtained from the user.

21. A method for disallowing an unverified call at wireless communication terminal, comprising the steps of:
 (a) accessing an application source to receive an application therefrom, wherein the application comprises at least one application unit executable on the wireless communication terminal;
 (b) providing an execution environment for the received application in which each of the at least one application unit in the received application is executed at a time;
 (c) before executing an application unit in the received application, determining if execution of the application unit will ensue an outgoing call to a telephone number;
 (d) if so determined, suspending execution of the application unit and verifying the telephone number; and
 (e) proceeding to execute the application unit if the telephone number is verified, whereas otherwise disallowing the call.

22. A method according to claim 21, further comprising providing at least one telephone number database, wherein verifying the telephone number comprises searching one or more of the at least one telephone number database for the telephone number.

23. A method according to claim 22, wherein the at least one telephone number database comprises any of: a first database that stores telephone numbers to which calls were originated from the communication terminal; a second database that stores telephone numbers from which calls were received by the communication terminal; and a telephone directory stored in the communication terminal.

24. A method according to claim 22, wherein the telephone number is verified when the telephone number is found in any of the one or more databases searched among the at least one telephone number database.

25. A method according to claim 24, wherein the telephone number is verified when the telephone number is found in a particular database selected from the at least one telephone number database.

26. A method according to claim 24, wherein the telephone member is verified when the telephone number is found commonly in more than one of the at least one telephone number database.

27. A method according to claim 21, wherein verifying the telephone number comprises selectively performing a different verification method for a different application.

28. A method according to claim 27, wherein the verification method verifies according to attributes of the application.

29. A method according to claim 28, wherein one of the attributes is an application source from which the application is received.

30. A method according to claim 29, wherein the verification method varies, depending upon how trustworthy the application source is.

31. A method according to claim 30, further comprising providing a plurality of telephone number databases, wherein verifying the telephone number comprises searching one or more of the plurality of telephone number databases for the telephone numbers.

32. A method according to claim 31, wherein the plurality of telephone number databases comprises any of: a first database that stores telephone numbers to which calls were originated from the communication terminal; a second database that stores telephone numbers from which calls were received by the communication terminal; and a telephone directory stored in the communication terminal.

33. A method according to claim 32, wherein a telephone number, which came with an application whose source is trustworthy, is verified when the telephone number is found in any one of the first and second databases and the telephone directory.

34. A method according to claim 32, wherein a telephone number, which came with an application whose source is doubted in its security, is verified when the telephone number is found in the telephone directory.

35. A method according to claim 21, wherein disallowing the call comprises terminating execution of the application.

36. A method according to claim 21, wherein verifying the telephone number comprises asking a user if it is permissible for the call to proceed to the telephone number.

37. A method according to claim 36, wherein disallowing the call comprise terminating execution of the application when permission is not obtained from the user.

38. A wireless communication terminal comprising:
 multiple communication functionalities comprising a voice communication functionality and a network browsing functionality;
 a plurality of telephone number databases to which different security levels are attributed;
 a network communication control that activates the network browsing functionality to access an external application source to thereby receive an application executable on the wireless communication terminal;
 an application platform that executes the received application, wherein the received application is programmed to initiate, while running on the communication terminal, call to telephone number; and
 telephone number manager that verifies the telephone number by searching one or more databases selected from the plurality of telephone number databases based on attributes of the received application, and allows the call to proceed to the telephone number if the telephone number is verified, whereas otherwise disallowing the call.

39. A communication terminal according to claim 38, wherein the plurality of telephone number databases comprises any of: a first database that stores telephone numbers to which calls were originated from the communication terminal; a second database that stores telephone numbers from which calls were received by the communication terminal; and a telephone directory stored in the communication terminal.

40. A communication terminal according to claim 39, wherein the telephone number is verified when the telephone number is found in any of the one or more databases selectively searched among the plurality of telephone number databases.

41. A communication terminal according to claim 40, wherein the telephone number is verified when the telephone number is found in a particular database selected among the plurality of telephone number databases.

42. A communication terminal according to claim 40, wherein the telephone number is verified when the telephone number is found commonly in more than one of the plurality of telephone number databases.

43. A communication terminal according to claim 38, wherein one of the attributes is an application source from which the application is received.

44. A communication terminal according to claim 43, wherein one or more databases are selectively searched among the plurality of telephone number databases, depending upon how trustworthy the application source is.

45. A communication terminal according to claim 38 wherein execution of the application is terminated when the telephone number is not verified.

46. A communication terminal according to claim 38, wherein if the telephone number manager fails to verify the telephone number, a user of the communication terminal will be asked if it is permissible to allow the call to proceed to the telephone number.

* * * * *